UNITED STATES PATENT OFFICE.

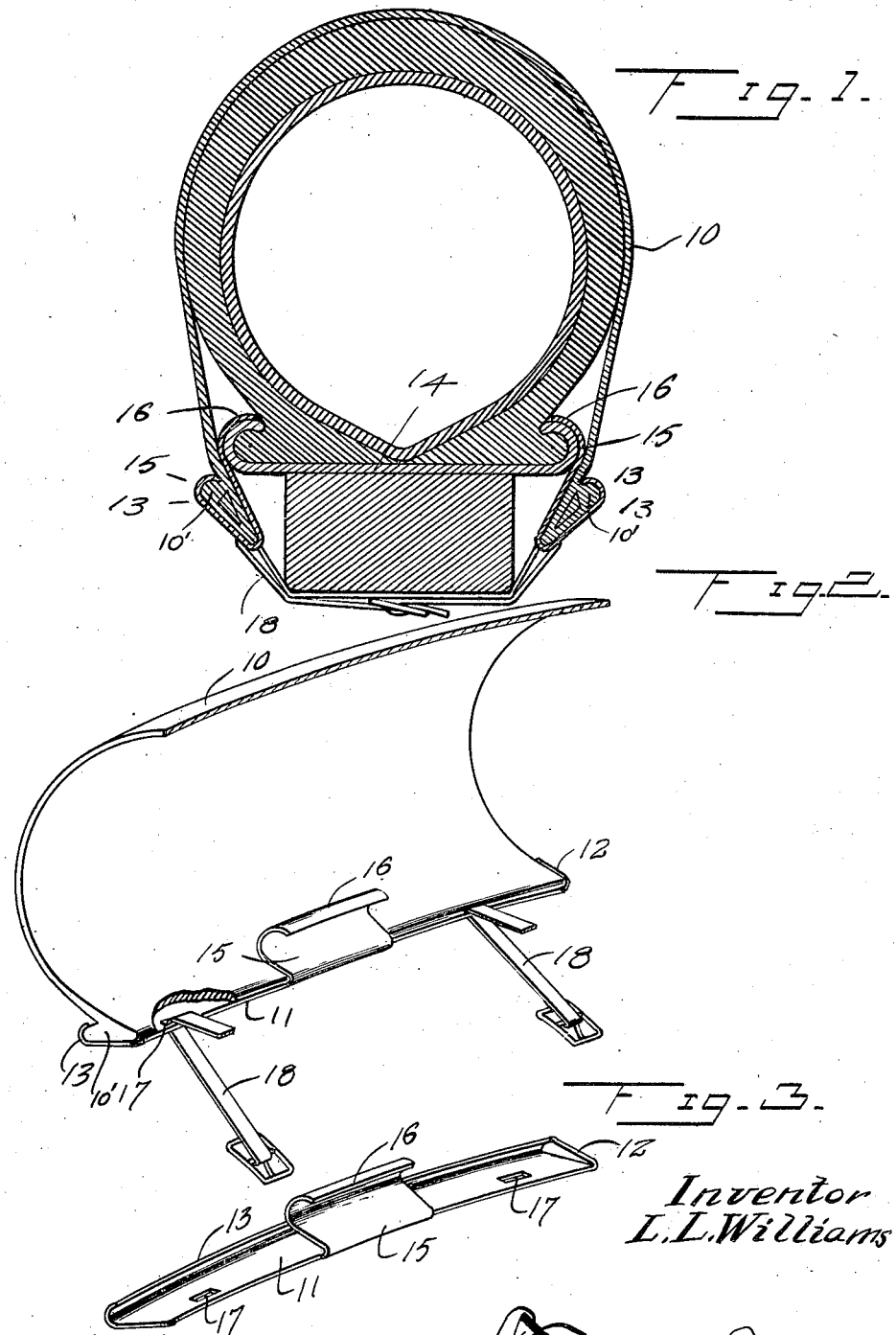

LAURIN L. WILLIAMS, OF ONEIDA, KANSAS.

TIRE PATCH.

1,425,925.  Specification of Letters Patent.  Patented Aug. 15, 1922.

Application filed September 12, 1919. Serial No. 323,259.

*To all whom it may concern:*

Be it known that I, LAURIN L. WILLIAMS, a citizen of the United States, residing at Oneida, in the county of Nemaha and State of Kansas, have invented certain new and useful Improvements in Tire Patches; and I do hereby declare the following to be a full, clear, and exact description of the invention, such as will enable others skilled in the art to which it appertains to make and use the same.

This invention relates to an improved tire patch and the principal object of the invention is to provide an improved type of clamp so constructed that it may be connected with a section of a tire casing thus permitting blowout patches to be formed from worn out tire casings. This does away with the necessity of purchasing specially constructed blowout patches and permits a tire casing which is no longer fit for use to be cut into sections and thus used.

Another object of the invention is to so construct the improved clamp that it may be easily connected with a section of a tire casing, when constructing the patch, and to further so construct the clamp that the section of tire casing cannot work loose, after being clamped in position upon a tire.

Another object of the invention is to so construct this clamp that it may obtain a firm grip upon the rim of the wheel and thus be securely held in place when the securing straps are tightened and the tire inflated.

Another object of the invention is to so construct this improved patch that it may be easily and quickly put in place.

This invention is illustrated in the accompanying drawings wherein:

Figure 1 is a transverse sectional view through a tire having the improved patch applied thereto.

Figure 2 is a sectional perspective view taken longitudinally through the patch.

Figure 3 is a perspective view of one of the clamps used in constructing the patch.

This patch is provided with a body 10 formed from a section of an old tire casing which will preferably have the tread portion cut away thus reducing the thickness of the patch upon the tread portion thereof and permitting the wheel to rotate upon the ground without excessive bumping. It is of course, to be understood that if desired, the tire may be simply cut into sections and the tread portion left in its original condition. In order to hold this section of casing about the tire, there has been provided an improved type of clamp for connection with the bead of the body 10. These clamps are of duplicate construction and therefore a description of one will suffice for both.

The clamp is formed from sheet metal and is clearly illustrated in the perspective view of Figure 3. This clamp 11 is provided with a flange 12 at one end and is provided with an outer side flange 13 which is curved as shown, thereby permitting the clamp to conform to the contour of the bead 10' of the body 10. It should be noted that the clamp is curved longitudinally and will therefore conform to the contour of the wheel rim 14. Intermediate the length of the clamp there has been provided a tongue 15 which extends over the body of the clamp transversely thereof and terminates in a hooked end portion 16 for engaging the wheel rim as clearly shown in Figure 1. Openings 17 are formed in the clamp to receive the securing strap 18 by means of which the patch will be secured about the tire and wheel rim.

When constructing the patch, a worn out tire casing will be cut into sections of the proper length and one of these sections will have the improved clamp connected therewith. These clamps will be placed in engagement with the bead of the casing as shown in Figures 1 and 2 and the patch is then ready for use. When putting the patch in place, the tire will be deflated and the patch will then be placed about the tire with the inner hook engaging the rim of the wheel upon opposite sides of the felly. The straps will then be carried across the felly and through the clamp openings and the free end portions of the straps then passed through the buckles and the straps tightened. The patch will then be securely connected with the rim of the wheel and the tire can be inflated. The patch will remain firmly in place and cannot move about the wheel during rotation of the latter upon the ground as the patch will be put in place with the unflanged end of the clamp positioned for first engagement with ground. Due to this fact, the body 10 will be forced into tight engagement with the flanges 12. When removing the patch it is simply necessary to release the straps and the patch can then be easily and quickly removed. It will thus be seen that there has been provided a tire patch which can be cheaply produced as it is simply necessary to purchase the clamps and then connect these clamps with sections of an old tire. It will be further noted that this device is so constructed that it can be easily and quickly put in place and securely held in place when in use.

What is claimed is:

1. A fastener for a tire patch made of a single blank of metal having first and second coacting walls to provide a loop to receive a portion of a patch therebetween, the first wall having a terminal patch-retaining hook extending towards the second wall, said second wall being longer than and extending beyond said hook, and said second wall having a terminal hook extending in the same direction as the first hook and engageable with a tire-mounting rim.

2. A fastener for a tire patch having first and second coacting walls to form a loop to receive a portion of a patch therebetween, the fastener being formed of a single blank of metal, the first wall being elongated and extending on opposite sides of the second wall, said first wall having a terminal patch-retaining hook extending towards the second wall, a flange at one end of the first wall extending in the same direction as said hook, said first wall having openings therethrough on opposite sides of the second wall for passage of a retaining element therethrough, said second wall being wider than and extending beyond said hook, and said second wall having a terminal hook extending in the same direction as the first hook and engageable with a tire-mounting rim.

In testimony whereof I affix my signature in presence of two witnesses.

LAURIN L. WILLIAMS.

Witnesses:
H. L. WIKOFF,
F. E. WIKOFF.